US011488461B1

(12) United States Patent
Roberts et al.

(10) Patent No.: US 11,488,461 B1
(45) Date of Patent: Nov. 1, 2022

(54) IDENTIFYING SMOKE WITHIN A VEHICLE AND GENERATING A RESPONSE THERETO

(71) Applicants: Toyota Connected North America, Inc., Plano, TX (US); Toyota Motor North America, Inc., Plano, TX (US)

(72) Inventors: Simon P. Roberts, Celina, TX (US); Yang Ding, Montreal (CA); Daniel W. Reaser, Oak Point, TX (US); Christopher J. Macpherson, Plano, TX (US); Keaton Khonsari, Dallas, TX (US); Derek A. Thompson, Dallas, TX (US); Sergei I. Gage, Redford, MI (US)

(73) Assignees: Toyota Motor North America, Inc., Plano, TX (US); Toyota Connected North America, Inc., Plano, TX (US)

( * ) Notice: Subject to any disclaimer, the term of this patent is extended or adjusted under 35 U.S.C. 154(b) by 0 days.

(21) Appl. No.: 17/340,985

(22) Filed: Jun. 7, 2021

(51) Int. Cl.
| | | |
|---|---|---|
| *G08B 17/12* | (2006.01) | |
| *G08B 17/10* | (2006.01) | |
| *G08B 21/18* | (2006.01) | |
| *H04W 4/40* | (2018.01) | |
| *G01S 13/06* | (2006.01) | |
| *G08B 5/22* | (2006.01) | |

(52) U.S. Cl.
CPC .............. *G08B 17/10* (2013.01); *G01S 13/06* (2013.01); *G08B 5/223* (2013.01); *G08B 21/182* (2013.01); *H04W 4/40* (2018.02)

(58) Field of Classification Search
CPC ...... G08B 17/10; G08B 5/223; G08B 21/182; G01S 13/06; H04W 4/40
See application file for complete search history.

(56) References Cited

U.S. PATENT DOCUMENTS

| | | | |
|---|---|---|---|
| 7,401,807 B2 | 7/2008 | Breed et al. | |
| 9,102,220 B2 | 8/2015 | Breed | |
| 9,865,150 B2 | 1/2018 | Brankovic et al. | |
| 10,159,435 B1 | 12/2018 | Brankovic | |
| 10,282,625 B1* | 5/2019 | Wengreen | G01C 21/3484 |
| 10,754,021 B2 | 8/2020 | Baheti et al. | |
| 10,875,468 B2 | 12/2020 | Saito et al. | |
| 10,953,830 B1* | 3/2021 | Christensen | B60R 21/01554 |
| 11,221,621 B2* | 1/2022 | Wengreen | B60W 60/0016 |

(Continued)

OTHER PUBLICATIONS

Sowah et al., "A Fire-Detection and Control System in Automobiles" IEEE Industry Applications Magazine Mar./Apr. 2019 pp. 1-11, 2019.

(Continued)

*Primary Examiner* — An T Nguyen
(74) *Attorney, Agent, or Firm* — Christopher G. Darrow; Darrow Mustafa PC

(57) ABSTRACT

System, methods, and other embodiments described herein relate to improving the safety of a vehicle in relation to occurrences of smoke and fire. In one embodiment, a method includes acquiring, from a radar of a subject vehicle, radar data about a passenger cabin of the subject vehicle. The method includes determining a current state of the passenger cabin according to the radar data. The method includes, responsive to identifying that the current state indicates smoke is present within the passenger cabin, controlling the subject vehicle to generate a response to the smoke.

17 Claims, 5 Drawing Sheets

(56) References Cited

U.S. PATENT DOCUMENTS

| | | | | |
|---|---|---|---|---|
| 2002/0080014 | A1* | 6/2002 | McCarthy | H03K 17/955 |
| | | | | 340/561 |
| 2017/0247000 | A1* | 8/2017 | Ricci | B60R 16/037 |
| 2018/0057013 | A1* | 3/2018 | Mullett | B60H 1/267 |
| 2020/0017050 | A1* | 1/2020 | Kim | B60R 21/01534 |
| 2020/0062080 | A1* | 2/2020 | Hernandez | B60H 1/00978 |
| 2020/0207298 | A1* | 7/2020 | Wensley | B60H 1/008 |
| 2020/0402391 | A1* | 12/2020 | Dutta | G08G 1/017 |
| 2021/0004002 | A1* | 1/2021 | Wengreen | G05D 1/0055 |
| 2021/0309124 | A1* | 10/2021 | Fields | B60W 30/095 |
| 2021/0310939 | A1* | 10/2021 | Brauer | G01N 21/255 |
| 2021/0383666 | A1* | 12/2021 | Tanaka | G08B 17/103 |
| 2022/0058930 | A1* | 2/2022 | Varughese | G01W 1/02 |

OTHER PUBLICATIONS

Khule et al., "Design and Implementation of a Fire Detection and Control System for Automobiles using Fuzzy Logic", found at: http://www.ijesrt.com/issues%20pdf%20file/Archive-2017/April-2017/17.pdf, Apr. 2017.
Alizadeh et al., "Low-cost Low-Power in-Vehicle Occupant Detection with mm-wave FMCW radar," 2019 IEEE Sensors, 2019, pp. 1-4, doi: 10.1109/SENSORS43011.2019.8956880,arXiv:1908.04417v1 [eess.SP] Aug. 12, 2019.
Steinhauer et al. "Millimeter-Wave-Radar Sensor Based on a Transceiver Array for Automotive Applications" IEEE Transactions on Microwave Theory and Techniques 56 (2008): 261-269.
Baird et al., "Principal Component Analysis-based Occupancy Detection with Ultra Wideband Radar," 2017 IEEE 60th International Midwest Symposium on Circuits and Systems (MWSCAS), 2017, pp. 1573-1576, doi: 10.1109/MWSCAS.2017.8053237.

\* cited by examiner

IDENTIFYING SMOKE WITHIN A VEHICLE AND GENERATING A RESPONSE THERETO

TECHNICAL FIELD

The subject matter described herein relates, in general, to systems and methods for sensing the presence of smoke and fire within a vehicle and, more particularly, to using radar to sense the presence of smoke and generating a response thereto.

BACKGROUND

Vehicles may employ various safety systems to protect passengers, such as airbags, active/passive restraints, automated control assistance (e.g., anti-lock braking systems (ABS)), door locks, and so on. However, a vehicle generally does not include systems to monitor certain hazards, such as fires. Consider that hundreds of vehicles are damaged by unexpected fires on a daily basis, which corresponds to significant monetary losses for owners and the insurance industry. Moreover, aside from the loss of the vehicle itself, harm can occur to passengers, especially passengers that are not able to exit the vehicle independently. Accordingly, difficulties exist surrounding the safety of vehicle passengers in relation to smoke and fire.

SUMMARY

Embodiments include systems and methods that relate to improving the safety of a vehicle in relation to occurrences of smoke and fire. As previously noted, vehicles generally do not include smoke/fire detection and/or suppression systems. The absence of such systems may be due to added expense and/or the complexity of smoke/fire sensors. In any case, the absence of smoke and fire detection within a vehicle can increase risks to passengers and the surroundings of the vehicle.

Therefore, in one embodiment, a disclosed approach functions to leverage a radar (e.g., millimeter-wave radar) within a vehicle to sense when smoke is present, from which different responses may be employed to improve the safety of passengers and the surroundings of the vehicle. For example, in one approach, a monitoring system may initially learn an ambient level of background noise observed by a radar when acquiring radar returns within the passenger cabin. The monitoring system can then monitor the background noise, which may also be referred to as a backscatter pattern. When the intensity of the backscatter pattern relative to a baseline increases, then the monitoring system determines that smoke is present and may take further actions.

That is, the smoke generally functions to sporadically increase scattering of radar signals that the radar transmits. The scattering is proportional to the density of the smoke. Thus, the monitoring system can compare the baseline from when the air in the passenger is clean to a presently acquired backscatter pattern from the radar data. By comparing the present value against the baseline the monitoring system can determine when smoke is present and further determine the smoke is of a particular type (e.g., from an electric vehicle battery) according to the density.

In any case, upon detection of the smoke, the monitoring system, in at least one arrangement, controls additional sensors of the vehicle to confirm the presence of a fire and/or determine additional contextual information in order to inform a subsequent response. For example, the presence of smoke within the vehicle can have multiple different sources. Of particular concern is when the smoke results from a fire within the vehicle itself; however, the smoke may also originate externally to the vehicle or from other sources, such as a passenger smoking a tobacco product. Accordingly, the monitoring system can further acquire sensor data from an additional sensor within the vehicle, such as a camera, and analyze the sensor data to identify behaviors of the passengers (e.g., to identify a passenger smoking, acting frantically as though a fire was present, acting calmly, etc.), and/or to explicitly identify a location of the fire.

In the instance where the behavior of the passenger indicates smoking, then the monitoring system may generate a response to warn the passenger about smoking within the vehicle. In one arrangement, the monitoring system provides the warning for a driver smoking when the vehicle is a ride-share vehicle or other passengers are present, such as children. In any case, the monitoring system may further determine that the source of the smoke is not present within the vehicle but is instead external to the vehicle, such as may occur with a wildfire. Thus, the sensing module 220 may control the vehicle to close a window and/or HVAC vents in order to avoid additional smoke from entering the vehicle.

In yet further aspects, when the smoke originates from inside the vehicle, the monitoring system can control various vehicle systems to notify nearby vehicles, pedestrians, etc. Additionally, the monitoring system may acquire the additional sensor data to determine how many passengers are present, locations of passengers in the passenger cabin, a type of fire (e.g., derived from the smoke density), and other characteristics about the vehicle and the present occurrence that can then be communicated to first responders in order to improve a response to the vehicle fire. In this way, the monitoring system can improve the safety of passengers in the vehicle and the surroundings of the vehicle by detecting the presence of smoke/fire and providing a response to counter the occurrence.

In one embodiment, a monitoring system for sensing smoke within a subject vehicle is disclosed. The monitoring system includes a processors and a memory storing instructions that, when executed by the processor, cause the processor to acquire, from a radar of the subject vehicle, radar data about a passenger cabin of the subject vehicle. The instructions include instructions to determine a current state of the passenger cabin according to the radar data. The instructions include instructions to, responsive to identifying that the current state indicates the smoke is present within the passenger cabin, control the subject vehicle to generate a response to the smoke.

In one embodiment, a non-transitory computer-readable medium for sensing smoke within a subject vehicle including instructions that, when executed by one or more processors, cause the one or more processors to perform various functions is disclosed. The instructions include instructions to acquire, from a radar of the subject vehicle, radar data about a passenger cabin of the subject vehicle. The instructions include instructions to determine a current state of the passenger cabin according to the radar data. The instructions include instructions to, responsive to identifying that the current state indicates the smoke is present within the passenger cabin, control the subject vehicle to generate a response to the smoke.

In one embodiment, a method is disclosed. In one embodiment, the method includes acquiring, from a radar of a subject vehicle, radar data about a passenger cabin of the subject vehicle. The method includes determining a current state of the passenger cabin according to the radar data. The method includes, responsive to identifying that the current state indicates smoke is present within the passenger cabin, controlling the vehicle to generate a response to the smoke.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
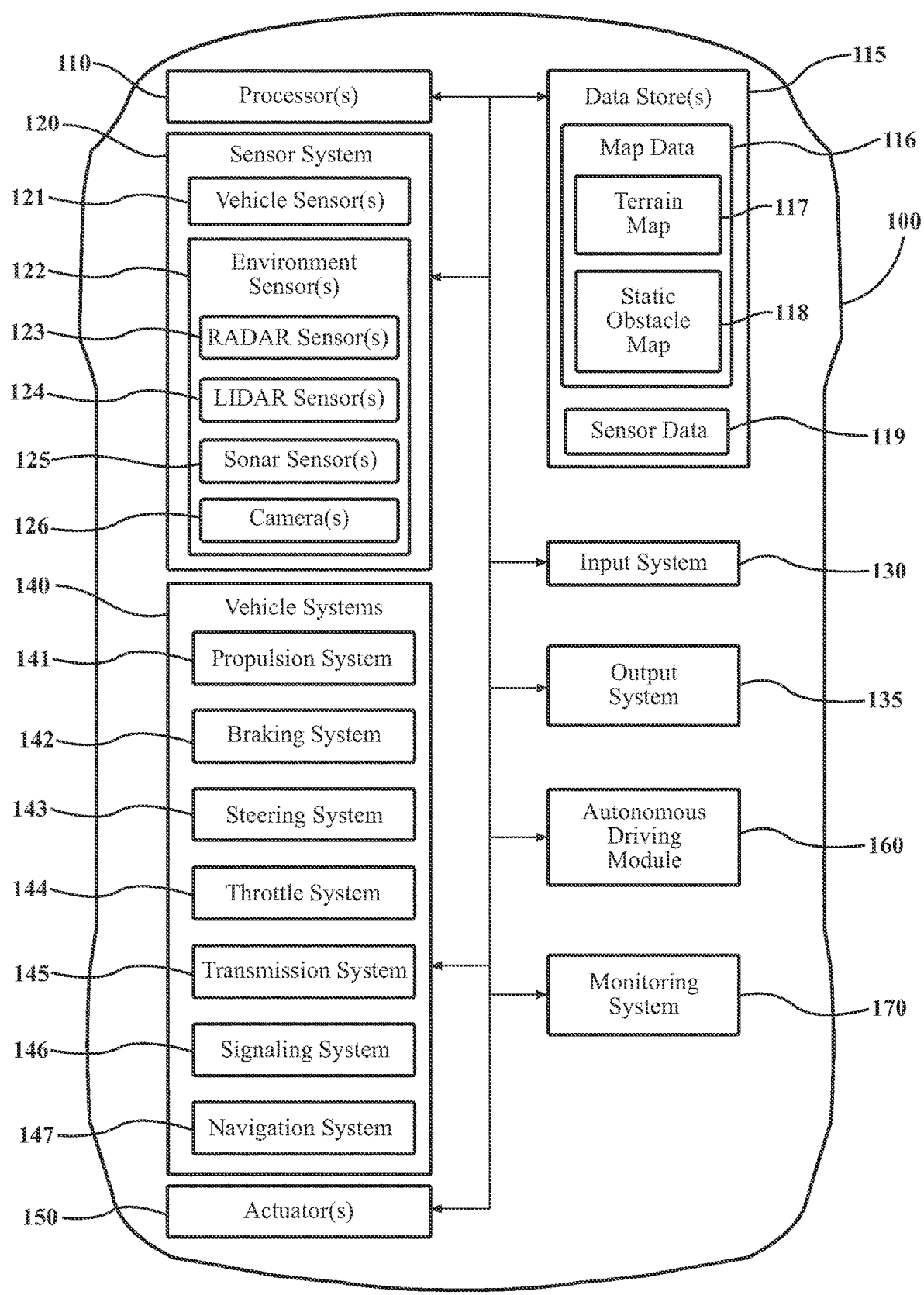
FIG. 1 illustrates one embodiment of a vehicle within which systems and methods disclosed herein may be implemented.

Systems, methods, and other embodiments associated with improving the safety of a vehicle in relation to occurrences of smoke and fire are disclosed. As previously noted, vehicles generally do not include smoke/fire detection and/or suppression systems. The absence of such systems may be due to added expense and/or the complexity of smoke/fire sensors. In any case, the absence of smoke and fire detection within a vehicle can increase risks to passengers and the surroundings of the vehicle.

Therefore, in one embodiment, a disclosed approach functions to leverage a radar (e.g., millimeter-wave radar) within a vehicle to sense when smoke is present, from which different responses may be employed to improve the safety of passengers and the surroundings of the vehicle. For example, in one approach, a monitoring system may initially learn an ambient level of background noise observed by a radar when acquiring radar returns within the passenger cabin. The monitoring system can then monitor the background noise, which may also be referred to as a backscatter pattern. When the intensity of the backscatter pattern relative to a baseline increases, then the monitoring system determines that smoke is present and may take further actions.

That is, the smoke generally functions to sporadically increase scattering of radar signals that the radar transmits. The scattering is proportional to the density of the smoke. Thus, the monitoring system can compare the baseline from when the air in the passenger is clean to a presently acquired backscatter pattern from the radar data. By comparing the present value against the baseline the monitoring system can determine when smoke is present and further determine the smoke is of a particular type (e.g., from an electric vehicle battery) according to the density.

In any case, upon detection of the smoke, the monitoring system, in at least one arrangement, controls additional sensors of the vehicle to confirm the presence of a fire and/or determine additional contextual information in order to inform a subsequent response. For example, the presence of smoke within the vehicle can have multiple different sources. Of particular concern is when the smoke results from a fire within the vehicle itself; however, the smoke may also originate externally to the vehicle or from other sources, such as a passenger smoking a tobacco product. Accordingly, the monitoring system can further acquire sensor data from an additional sensor within the vehicle, such as a camera, and analyze the sensor data to identify behaviors of the passengers (e.g., to identify a passenger smoking, acting frantically as though a fire was present, acting calmly, etc.), and/or to explicitly identify a location of the fire.

In the instance where the behavior of the passenger indicates smoking, then the monitoring system may generate a response to warn the passenger about smoking within the vehicle. In one arrangement, the monitoring system provides the warning for a driver smoking when the vehicle is a ride-share vehicle or other passengers are present, such as children. In any case, the monitoring system may further determine that the source of the smoke is not present within the vehicle but is instead external to the vehicle, such as may occur with a wildfire. Thus, the monitoring module 220 may control the vehicle to close a window and/or HVAC vents in order to avoid additional smoke from entering the vehicle.

In yet further aspects, when the smoke originates from inside the vehicle, the monitoring system can control various vehicle systems to notify nearby vehicles, pedestrians, etc. Additionally, the monitoring system may acquire the additional sensor data to determine how many passengers are present, locations of passengers in the passenger cabin, a type of fire (e.g., derived from the smoke density), and other characteristics about the vehicle and the present occurrence that can then be communicated to first responders in order to improve a response to the vehicle fire. In this way, the monitoring system can improve the safety of passengers in the vehicle and the surroundings of the vehicle by detecting the presence of smoke/fire and providing a response to counter the occurrence.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that carries passengers within a defined space that is a passenger cabin. Thus, presently disclosed approaches may extend to buses, trains, and other people-moving systems.

In any case, the vehicle 100, as described herein, also includes various elements. It will be understood that, in various embodiments, it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a monitoring system 170 that functions to improve the safety of passengers within a vehicle by sensing smoke within the passenger cabin and controlling the vehicle 100 to take mitigating actions according to a particular context (e.g., smoke from inside or outside, actions of passengers, type of fire, etc.). The noted functions and methods will become more apparent with a further discussion of the figures.

Figure 2:
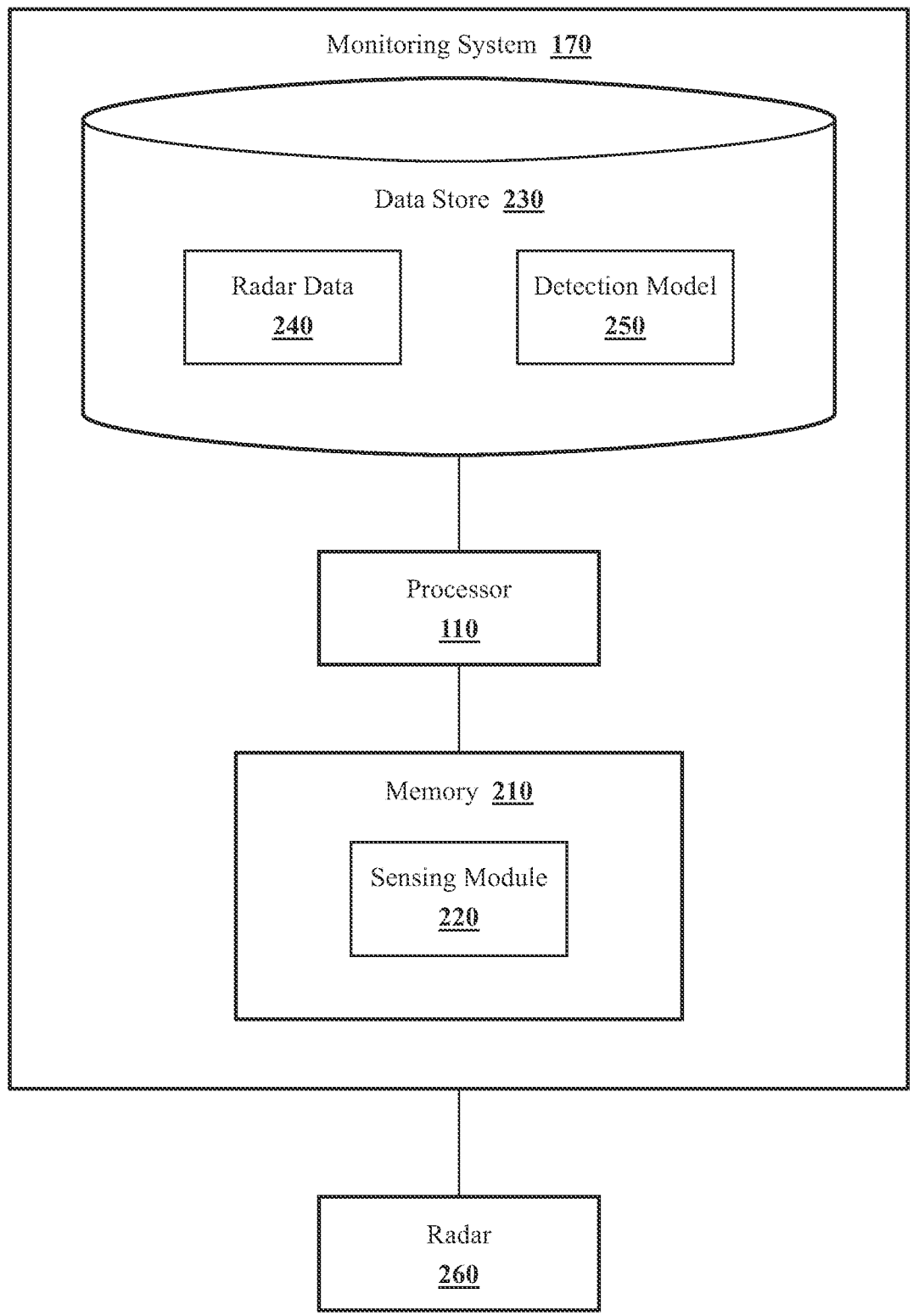
FIG. 2 illustrates one embodiment of a monitoring system that is associated with sensing the presence of smoke within a passenger cabin of a vehicle using a radar.

With reference to FIG. 2, one embodiment of the monitoring system 170 is further illustrated. The monitoring system 170 is shown as including a processor 110. Accordingly, the processor 110 may be a part of the monitoring system 170 or the monitoring system 170 may access the processor 110 through a data bus or another communication path. In one or more embodiments, the processor 110 is an application-specific integrated circuit (ASIC) that is configured to implement functions associated with a sensing module 220. In general, the processor 110 is an electronic processor, such as a microprocessor, that is capable of performing various functions, as described herein. In one embodiment, the monitoring system 170 includes a memory 210 that stores the sensing module 220. The memory 210 is a random-access memory (RAM), read-only memory (ROM), a hard disk drive, a flash memory, or another suitable memory for storing the module 220. The module 220 is, for example, computer-readable instructions that, when executed by the processor 110, cause the processor 110 to perform the various functions disclosed herein. Of course, the module 220, in an alternative approach, includes hardware logic, a programmable logic array, or another hardware-based processing system that implements the instructions in a physical form.

Furthermore, in one embodiment, the monitoring system 170 includes a data store 230. The data store 230 is, in one arrangement, an electronic data structure, such as a database that is stored in the memory 210 or another memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes radar data 240 and a detection model 250 along with, for example, other information that is used by the module 220.

With continued reference to FIG. 2, the sensing module 220 generally includes instructions that function to control the processor 110 to acquire the radar data 240 about a passenger cabin of the vehicle 100 from a radar 260 within the vehicle 100. Accordingly, the sensing module 220, in one embodiment, controls at least one radar 260 within the vehicle 100 to provide the radar data 240. In further embodiments, the sensing module 220 may acquire sensor data from further sensors other than the radar 260, such as cameras, ultrasonic sensors, and so on of the passenger cabin to support determinations associated with identifying smoke and/or to make further determinations. For example, the sensing module 220, in one approach, fuses data from separate sensors to provide an observation about a particular aspect of the passenger cabin of the vehicle 100. By way of example, the sensor data itself, in one or more approaches, may take the form of separate images, radar returns (i.e., radar data 240), LiDAR returns, telematics data, and so on. Generally, the sensing module 220 derives determinations (e.g., location, movement, size, etc.) from the acquired sensor data and fuses the data for separate aspects of the observed space with corresponding information.

Of course, while multiple sources are mentioned, the sensing module 220 may rely on the radar data 240 alone to sense smoke and/or position, movements, and other aspects about passengers in the vehicle 100. Additionally, while the sensing module 220 is discussed as controlling the various sensors to provide the sensor data, in one or more embodiments, the sensing module 220 can employ other techniques that are either active or passive to acquire the sensor data. For example, the sensing module 220 may passively sniff the sensor data from a stream of electronic information provided by the various sensors to further components within the vehicle 100. Moreover, while the sensing module 220 is discussed as performing the noted functions within the vehicle 100, in one or more arrangements, the sensing module 220 may be located remotely from the vehicle 100 as a cloud resource to process the radar data 240 and/or other acquired sensor data.

With reference to the radar 260 itself, in one arrangement, the radar 260 is a millimeter-wave (MMW) radar. Thus, radar 260 may use electromagnetic signals having a frequency of about 60 GHz, although various implementations may provide signals with different frequencies, such as in the range of 30 to 300 GHz. In further arrangements, the radar 260 is an ultra-wideband (UWB) radar or another type of radar that provides for the functionality discussed herein. The radar 260 itself may be configured as multiple separate devices and/or with multiple antennas to improve sensing a whole volume of the passenger cabin. In general, the selection of a particular type for the radar 260 is related to the functionality provided by the radar 260. For example, the radar 260 generally provides for observing the passenger cabin and may provide for sensing through objects. That is, the radar 260 is capable of imaging the passenger through objects or, phrased otherwise, can see through objects. In the context of sensing smoke, the radar 260 provides a particular resolution of data that can sense the backscatter pattern caused by particulates from the smoke. In this way, the sensing module 220 acquires information about the passenger cabin to sense the presence of various objects and conditions within the passenger cabin (e.g., smoke).

Moreover, the radar 260 may provide information about separate areas within the passenger cabin, such as separate seats, floor spaces, and so on. In one arrangement, the perceived areas can extend beyond the immediate passenger cabinet to a trunk, engine bay, truck bed, etc. Thus, in general, the radar data 240 provides observations of areas within the passenger cabin where a fire may occur in order to provide a complete observation of the passenger cabin and, in some arrangements, areas beyond the passenger cabin.

Accordingly, the sensing module 220 includes instructions to acquire the radar data 240 about the passenger cabin of the vehicle 100 and, in at least one arrangement, performs an analysis of the radar data 240 to determine a current state of the passenger cabin, which can include detecting the presence of smoke. In general, the sensing module 220 analyzes the radar data 240 by determining when a radar haze is present. In other words, the sensing module 220 determines when a backscatter pattern (e.g., noise within a field observed by the radar 260) increases in intensity over a baseline of noise that is otherwise observed. Because the smoke particles are generally distributed within the air, the radar 260 senses the smoke as an increase in noise that corresponds with the density of the smoke.

By way of example, when the smoke is slight, such as may occur when a fire first ignites or when smoke from a fire outside of the vehicle 100 enters through a window, the radar data 240 may indicate the presence of the smoke by showing a slight increase in noise across radar data 240. By contrast, when the smoke is dense, such as may occur with a fire that is more advanced or when the smoke is from a source that generates a particular type of smoke (e.g., a lithium-ion battery), then the radar data 240 indicates an increased intensity of distributed noise across an observed area from the increased density of particles. Thus, the sensing module 220 can identify different densities of smoke within the passenger cabin. Moreover, the sensing module 220 can also identify a source of the smoke or areas within the passenger cabin where the smoke is denser.

For example, the sensing module 220 can distinguish between areas having different backscatter intensities within the passenger cabin that correspond to different levels of smoke intensity/density. The areas of different smoke intensity should generally correspond to a location of a source for the smoke (e.g., a fire or smoldering area) within the vehicle. Thus, by way of example, if an operator side of the vehicle 100 includes denser smoke and/or there is a defined area or plume of smoke within the operator side versus more dispersed smoke on a passenger side of the vehicle 100, then the sensing module 220 can estimate the location of the source as likely on the passenger side at the area of the plume. Of course, the sensing module 220 may further use additional elements of the sensor data, such as images, etc., to validate determinations from the radar data 240. That is, in addition to using the radar data 240, the sensing module 220 uses, for example, images, infrared, cabin temperature sensors, and so on to further validate and localize the identification of a source of the smoke within the passenger cabin.

In any case, the sensing module 220 iteratively acquires the radar data 240 to determine a current state of the passenger cabin relative to at least the presence of smoke. Of course, in various approaches, determining the current state can also include identifying the presence and location of passengers, determining behaviors of passengers, and so on. In one approach, the sensing module 220 identifies when a backscatter pattern of the radar data 240 satisfies a threshold. The threshold may define, for example, a difference in intensity compared to a baseline that is a backscatter pattern acquired from when the passenger cabin is free of smoke. Thus, the difference can inform an extent to which particulates from the smoke interfere with the radar 260 acquiring the radar data 240 about the passenger cabin.

In a further approach, the sensing module 220 implements a detection model 250 that learns a pattern for the presence of smoke within the radar data 240. For example, consider that the detection model 250, in one configuration, is a machine learning algorithm, such as a convolutional neural network (CNN), a recurrent neural network (RNN), or another deep neural network. In any case, the detection model 250 may be integrated with the sensing module 220 and may process the radar data 240 to identify patterns that correlate with smoke within the passenger cabin. Moreover, in one arrangement, the detection model 250 uses the radar data 240 and additional sensor data, such as images, infrared, etc., as an input when identifying smoke/fire. In any case, the detection model 250 can process the radar data 240 to identify the patterns associated with the presence of smoke and indicate a probability of the presence. Moreover, it should be appreciated that the detection model 250 may learn the patterns for different types of smoke (e.g., from different combustion sources), different locations of a source in the passenger cabin, and so on.

Because the sensing module 220 can identify whether the source (i.e., a fire) of the smoke is within the passenger cabin and a location of the source, the sensing module 220, in one arrangement, can further infer when the source is outside of the passenger cabin, such as may occur with a wildfire, when another vehicle is on fire, and so on. As such, the sensing module 220 can target a response according to a location within the subject vehicle 100 or outside of the vehicle 100. For example, when the sensing module 220 determines that smoke is present in the vehicle 100, the sensing module 220, in one or more arrangements, can control the vehicle 100 to perform various actions, including alerting an operator of the vehicle, alerting nearby pedestrians through an audible alarm, alerting nearby/approaching vehicles via a communication (e.g., V2X), transmitting a communication to emergency responders about the occurrence, and controlling one or more vehicle systems to attempt to mitigate the fire/smoke (e.g., closing windows, closing vents, autonomously performing a pullover maneuver, etc.). Similarly, the sensing module 220 may perform particular actions when the smoke is originating from outside of the vehicle 100, such as closing windows, closing vents (i.e., HVAC vents), alerting the operator/passengers, and so on.

Moreover, in addition to providing communications to first responders or other vehicles about the occurrence of the fire/smoke, the sensing module 220 may include additional information about the occurrence to improve a response. Thus, in one approach, the sensing module 220 generates initial determinations about the passenger cabin to acquire helpful information to include in the communication. The initial determinations may include identifying the presence of passengers in different seats and the characteristics of the passengers. In one configuration, the sensing module 220 actively identifies when a passenger enters/exits the vehicle 100. Thus, the sensing module 220 may use a door sensor to identify when a passenger may be entering/exiting and perform a scan to identify the presence of a passenger and a particular location within the passenger cabin. Thus, in one arrangement, determining the presence of the passenger is an ongoing determination of a current state of the passenger cabin that functions to dynamically determine changes within the passenger cabin and may further include determining contextual indicators associated more broadly with the vehicle 100, such as determining dynamics of the vehicle 100 (e.g., whether the vehicle is parked or moving and a current trajectory of the vehicle 100 when moving), behaviors of the passengers, and so on.

The sensing module 220 further, in one approach, determines an age for the passenger once detected to acquire information that informs an emergency service that is responding to the incident involving the fire/smoke. Thus, the sensing module 220 may use the radar data 240 to estimate a size of the passenger (e.g., height, volume, etc.) in order to provide an estimate of the age. In further arrangements, the sensing module 220 may leverage additional sensors in the vehicle 100 to make this assessment, such as weight sensors in the seats of the vehicle 100. In one arrangement, the sensing module 220 processes the radar data 240 using a machine learning model, such as the detection model 250. Thus, in one approach, the detection model 250 processes the radar data 240 by identifying clusters of associated points within a point cloud from which the detection model 250 defines a volume associated with the passenger, which may indicate a pose and various attributes of the passenger. As such, the detection model 250 can then output an estimated height of the passenger, which the sensing module 220 can use to generally estimate the age of the passenger.

While the acquisition of the additional information about the passengers and passenger cabin is discussed as a mechanism to further inform responders, the sensing module 220 can also leverage the information to adapt a response upon detecting smoke. For example, the sensing module 220, in at least one arrangement, performs behavior recognition on the passengers of the vehicle 100. The behavior recognition includes identifying current actions of the passengers, including whether the passengers are currently calm, frantic, etc. The behavior recognition can further include identifying whether a passenger is using a tobacco product, such as a cigarette, cigar, vaporizer, etc. In general, the sensing module 220 may implement a machine learning model to process the sensor data (e.g., the radar data 240 in combination with images) and extract and classify features identified therein to identify corresponding behaviors.

Accordingly, the sensing module 220 can use the determined behavior to distinguish between different occurrences and validate the presence of a fire. In one example, the sensing module 220 uses the identified behavior to determine whether smoke is originating from within the vehicle 100, such as when a passenger is smoking a tobacco product. For such an occurrence, the sensing module 220 can control the vehicle 100 to, for example, increase ventilation, open a window, and so on. When a passenger, in addition to the smoking passenger, is detected, the sensing module 220 may provide an alert if the additional passenger is an infant/juvenile.

Moreover, when smoke is detected, the sensing module 220 can validate the occurrence of a fire by identifying frantic/alarmed behaviors, which may include a passenger attempting to exit the vehicle 100, or potentially negate an alert when the identified behaviors indicate the passenger is calm. In this way, the sensing module 220 can improve the safety of passengers by detecting the presence of smoke but also ensure an intelligent response that avoids false alerts.

Figure 3:
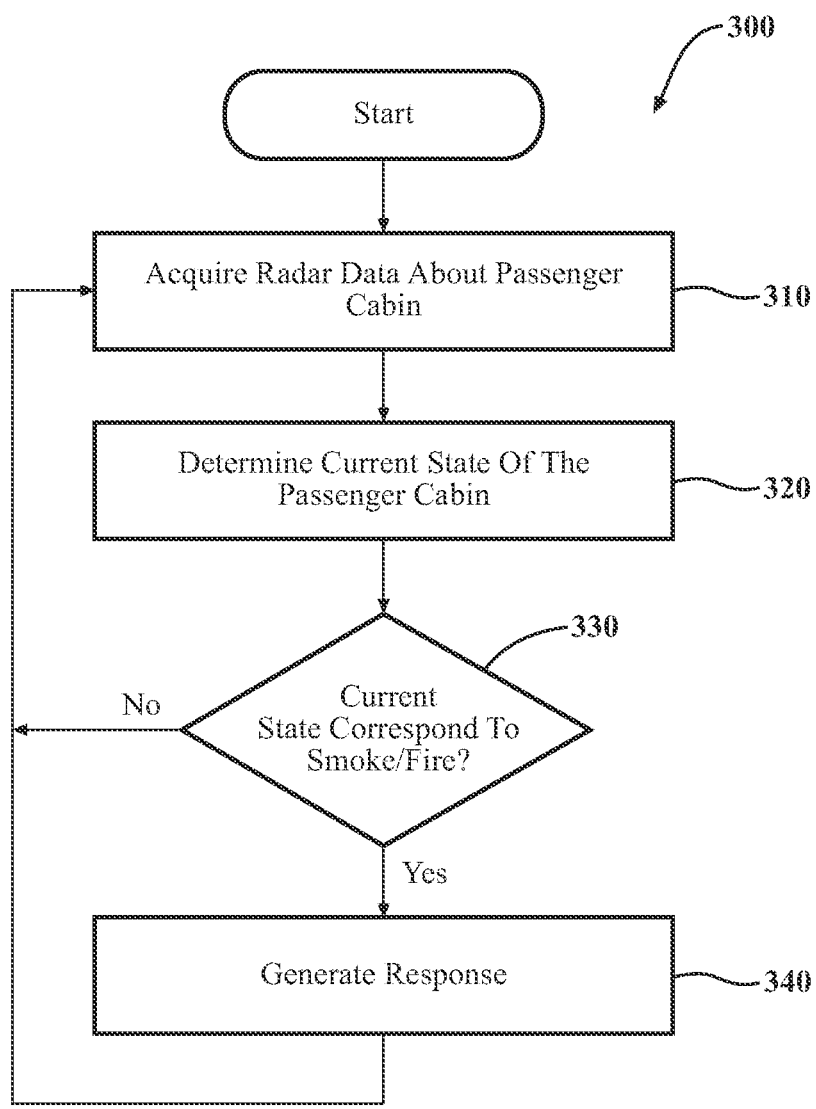
FIG. 3 illustrates one embodiment of a flowchart associated with a method of sensing the presence of smoke within a passenger cabin of a vehicle using a radar.

Additional aspects of improving the safety of passengers by sensing smoke will be discussed in relation to FIG. 3. FIG. 3 illustrates a flowchart of a method 300 that is associated with sensing smoke within a passenger cabin of a vehicle. Method 300 will be discussed from the perspective of the monitoring system 170. While method 300 is discussed in combination with the monitoring system 170, it should be appreciated that the method 300 is not limited to being implemented within the monitoring system 170 but is instead one example of a system that may implement the method 300.

At 310, the sensing module 220 acquires, from the radar 260, the radar data 240 about a passenger cabin of the vehicle 100. As previously noted, the sensing module 220 iteratively acquires the radar data 240 in order to provide a real-time assessment of the interior of the vehicle 100 in relation to the presence of smoke along with, for example, positions and behaviors of passengers. Accordingly, while the acquisition of the radar data 240 is shown in a serial manner in line with the further functions of method 300, the sensing module 220 may perform the acquisition of the radar data 240 in parallel with one or more of the further disclosed functions.

Moreover, the radar data 240 itself is generally of an area encompassing all seating areas within the vehicle 100 and may extend to other compartments of the vehicle 100, such as a trunk. Thus, the radar data 240 from the radar 260 includes information about the passengers, including passenger movements/behaviors and areas surrounding the passengers. As a general trait, the sensing module 220 can use the radar data 240 to distinguish between static and dynamic objects in the passenger cabin and can further sense properties of materials and the air within the passenger cabin.

At 320, the sensing module 220 determines a current state of the passenger cabin according to the radar data 240. For example, the sensing module 220 uses the radar data 240 to sense the presence of passengers along with additional aspects, such as whether smoke is present within the passenger cabin. Thus, the sensing module 220 generally processes the radar data 240 using the detection model 250, which may include a machine learning model, a heuristic-based approach, or a combination of the two. As previously mentioned, the sensing module 220 can leverage the detection model 250 to analyze a point cloud, which is a form in which the radar 260 provides the radar data 240, to cluster, segment, and classify points/voxels to identify objects and movements of objects in the passenger cabin in addition to determining properties of the objects, such as a density.

Moreover, because the radar 260 is, in at least one approach, a millimeter-wave (MMW) radar, the radar 260 can focus attention on different areas of the passenger cabin regardless of obstructions, such as personal items of passengers. Accordingly, the sensing module 220 is able to leverage the abilities of the radar 260 and determine when passengers are present in different seats while also identifying characteristics about the passengers, such as age, a current condition, and so on.

Additionally, the sensing module 220 also determines aspects about the vehicle 100 itself, including the presence of smoke and fire within the vehicle 100. In one arrangement, the sensing module 220 determines the presence of smoke according to a pattern of the smoke within the radar data 240, which may be detected over a single frame or a series of frames (i.e., acquisitions of the radar data 240). Further, the detection model 250 may utilize a baseline reading of the cabin that is an ambient backscatter pattern of noise from when the passenger cabin is empty and there is no smoke. Thus, in one arrangement, the sensing module 220 determines a density of the smoke according to the baseline. Because the sensing module 220 can determine the density of the smoke and can further observe different areas of the passenger cabin, the sensing module 220 is capable of identifying areas of different smoke densities in the passenger cabin, which can facilitate estimating the location of a source of the fire.

For example, when a fire occurs within the vehicle 100, the smoke is generally most dense at a source of the fire while remaining areas generally exhibit less dense smoke. Accordingly, the sensing module 220 can use this property about the way in which fire/smoke behave in order to identify a location with the vehicle 100 where the smoke originates, and the fire is present. In further arrangements, the sensing module 220 uses information from additional sensors, such as temperature sensors in the passenger cabin, infrared sensors, cameras, and so on to further identify the fire and/or validate the determinations from the radar data

240. In this way, the sensing module 220 can determine when dangers arise from smoke/fire and provide a mitigating response.

At 330, the sensing module 220 identifies whether the current state indicates that smoke is present in the passenger cabin. In one arrangement, the sensing module 220 references the current state, which provides a comparison of an intensity of a scatter pattern with a baseline. Thus, when the difference satisfies a threshold (e.g., a change of 10%), then the sensing module 220 indicates that smoke is present and proceeds with generating a response at 340. Moreover, as explained previously, when the sensing module 220 does sense smoke, an additional determination about the location of the smoke may be undertaken to further assess the context. That is, particular areas within the passenger cabin where a fire may occur may correspond with more severe events and/or may pose increased risks. For example, when the location of the fire corresponds with a lithium-ion battery for an electric vehicle, then the risk increases because of the nature of fires associated with this type of component.

At 340, the sensing module 220 controls the vehicle 100 to generate a response to the smoke. In one arrangement, the sensing module 220 the particular response may depend on further contextual cues from the passenger cabin, such as behaviors of the passengers (e.g., smoking, acting frantically, acting calmly, etc.), whether windows are open or closed, a location of the fire/smoke, and so on. Accordingly, the sensing module 220 may reference the current state to determine the contextual cues from which the sensing module 220 can select a particular response or set of responses.

The responses can include a wide range of functions, including controlling windows to open or close, unlocking doors, opening/closing a sun/moon roof, opening/closing vents, generating communications, and so on. In regards to the communications, the sensing module 220 can provide a message via a vehicle-to-anything (V2X) communication that indicates to a nearby vehicle a location of the vehicle and the presence of a fire, provide an alert to a pedestrian that is proximate to the subject vehicle 100 via audible or electronic means, and transmitting a communication about the current state to an emergency service (e.g., fire/EMS). The communication, in one or more arrangements, can indicate various information to the emergency service, such as a number of passengers in the vehicle, a location of the fire, characteristics about the passengers, and characteristics about the smoke. Thus, the monitoring system 170 can provide important contextual information to those responding to the emergency in order to prepare the responders and ensure that a response is timely and properly prepared to handle particular aspects of the event. That is, for example, by referencing the number of passengers the emergency responders may dispatch additional ambulances or an ambulance with particular capabilities (e.g., smoke inhalation). Further, the responders may dispatch particular equipment to handle a lithium-ion battery fire, and so on. In this way, the monitoring system 170 improves the safety of passengers and also the surroundings of the vehicle 100.

Figure 4:
FIG. 4 is an illustration depicting a passenger smoking within a vehicle.
Figure 5:
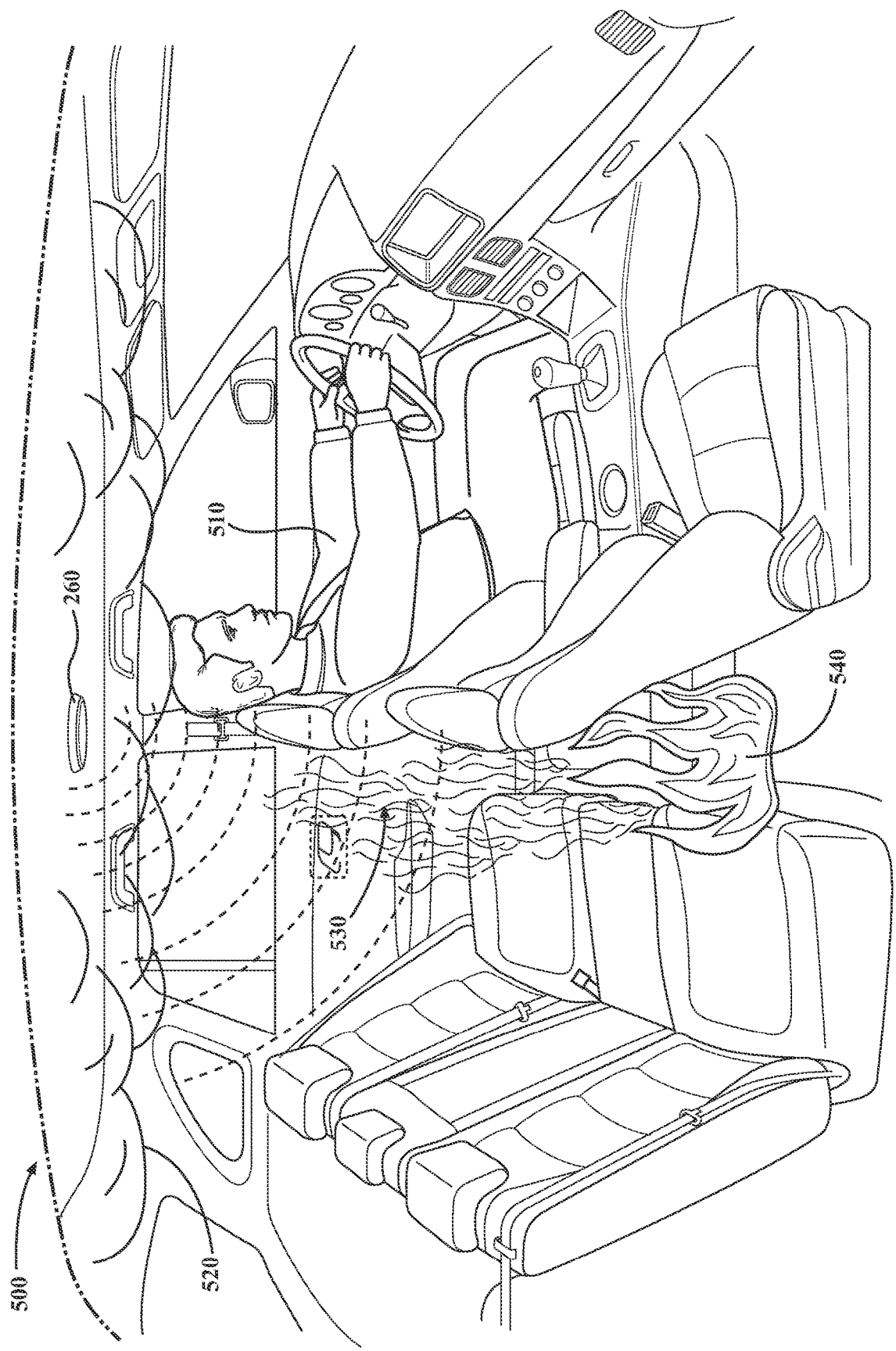
FIG. 5 is an illustration depicting a smoke from a fire within a vehicle.

With reference to FIGS. 4-5, additional examples of how the monitoring system 170 functions to improve the safety of the passengers will be described. FIG. 4 illustrates a passenger cabin from a view 400. As shown in the view 400, a passenger 410 is seated within the vehicle. Moreover, the passenger 410 is smoking a tobacco product that causes a cloud of smoke 420 within the passenger cabin. Accordingly, the monitoring system 170 acquires radar data 240 from the radar 260 to determine a current state of the passenger cabin. As a result of processing the radar data 240, the monitoring system 170 identifies the presence of smoke and that the smoke is originating from an area of the passenger 410. Accordingly, the monitoring system 170 further correlates a behavior of the passenger 410 to confirm whether the smoke is present due to an emergency event. As such, the monitoring system 170 identifies that the passenger 410 is smoking a tobacco product (e.g., a cigarette, cigar, vaporizer, etc.). Thus, instead of generating a response indicative of a fire within the vehicle 100, the monitoring system 170 may instead provide an alert to the operator/owner, provide an alert to the passenger 410 requesting cessation of such activities, and/or log the activity for reporting. In further approaches, the monitoring system 170 controls one or more vehicle systems, such as an HVAC system to expel the smoke, a window to open and expel the smoke, and so on.

With reference to FIG. 5, a view 500 of a passenger cabin is illustrated. As shown in FIG. 5, an operator 510 is controlling the vehicle 100 while smoke 520 begins to fill the passenger cabin. Accordingly, the monitoring system 170 functions to initially determine the current state of the passenger cabin from which the smoke 520 is identified. Moreover, because the radar 260 captures a whole view of the passenger cabin, the monitoring system 170 may localize a source of the smoke 520 by identifying a particular location where smoke 530 is originating. Further, while localizing the smoke 530 to a rear footwell of the passenger cabin, the monitoring system 170 can further identify the presence of a fire 540 through the use of additional sensors, such as cabin temperature sensors, infrared imaging, and so on. In any case, once identified, the monitoring system 170 may further analyze a behavior of the operator 510. That is, the monitoring system 170 can validate the presence of the fire 540 by determining how the operator 510 is acting. Accordingly, in the instant example, the monitoring system 170 can analyze the radar data 240 to identify movements and poses of the operator 510 that are indicative of coughing or other behaviors (e.g., frantic movements) that are associated with the presence of the fire 540. As such, the monitoring system 170 can then generate a response by controlling the vehicle 100 to communicate an alert to oncoming vehicles, to an emergency service, etc. The monitoring system 170 may further control various vehicle systems to mitigate the fire and/or facilitate egress of the operator 510 from the vehicle 100. In this way, the monitoring system improves the safety of the operator 510 and the surroundings of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. The braking system 142 may further embody an anti-lock braking system (ABS) that generally functions to prevent tires of the vehicle 100 from sliding during a braking maneuver. That is, the ABS functions to detect wheel slip and adjusts braking to prevent the wheel slip, thereby generally improving braking distances in various conditions. Moreover, the braking system 142 and/or the autonomous driving module 160 may include an electronic stability control (ESC) system that functions to selectively brake individual wheels of the vehicle 100 to maintain overall vehicle stability.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the monitoring system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the monitoring system 170, and/or the autonomous driving module(s) 160 may control some or all of these vehicle systems 140 and, thus, may be partially or fully autonomous.

The processor(s) 110, the monitoring system 170, and/or the autonomous driving module(s) 160 can be operatively connected to communicate with the various vehicle systems 140 and/or individual components thereof. For example, returning to FIG. 1, the processor(s) 110, the monitoring system 170, and/or the autonomous driving module(s) 160 can be in communication to send and/or receive information from the various vehicle systems 140 to control the movement, speed, maneuvering, heading, direction, etc. of the vehicle 100. The processor(s) 110, the monitoring system 170, and/or the autonomous driving module(s) 160 may control some or all of these vehicle systems 140.

The processor(s) 110, the monitoring system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the monitoring system 170, and/or the autonomous driving module(s) 160 can control the direction and/or speed of the vehicle 100. The processor(s) 110, the monitoring system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the monitoring system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A monitoring system for sensing smoke within a subject vehicle, comprising:
a processor; and
a memory storing instructions that, when executed by the processor, cause the processor to:
acquire, from a radar of the subject vehicle, radar data about a passenger cabin of the subject vehicle;
determine a current state of the passenger cabin according to the radar data; and
responsive to identifying that the current state indicates the smoke is present within the passenger cabin, control the subject vehicle to generate a response to the smoke;
wherein the instructions to identify that the current state indicates smoke is present include instructions to compare an intensity of a scatter pattern detected by the radar with a baseline that defines an observation by the radar within the passenger cabin without a presence of smoke.

2. The monitoring system of claim 1, wherein the instructions to determine the current state include instructions to determine a density of the smoke to estimate a source of a fire by determining an increase in the intensity compared to the baseline.

3. The monitoring system of claim 1, wherein the instructions to control the subject vehicle to generate the response includes instructions to analyze sensor data from a sensor other than the radar to identify a behavior of an operator, and wherein the behavior is one of smoking, acting frantically, and acting calmly, and wherein the instructions to control the subject vehicle to generate the response include instructions to selecting the response according to the behavior.

4. The monitoring system of claim 1, wherein the instructions to identify that the current state indicates smoke is present include instructions to identify a location of a fire within the passenger cabin according to at least the radar data, and wherein the instructions to control the subject vehicle to generate the response include instructions to select the response according to the location.

5. The monitoring system of claim 1, wherein the instructions to determine the current state of the passenger cabin includes determining whether a window of the subject vehicle is down and whether a source of the smoke is from outside of the subject vehicle, and wherein the instructions to control the subject vehicle to generate the response include instructions to control the window to close.

6. The monitoring system of claim 1, wherein the instructions to control the subject vehicle to generate the response include instructions to perform at least one of: provide a message via a vehicle-to-anything (V2X) communication that indicates to a nearby vehicle a location of the subject vehicle, provide an alert to a pedestrian that is proximate to the subject vehicle, closing a vent of the subject vehicle, and transmit a communication about the current state to an emergency service, and wherein the communication indicates at least one of: a number of passengers in the subject vehicle, a location of a fire, characteristics about the passengers, and characteristics about the smoke.

7. The monitoring system of claim 1, wherein the radar is one of a millimeter-wave (MMW) radar, and an ultra-wideband (UWB) radar.

8. A non-transitory computer-readable medium for sensing smoke within a subject vehicle and comprising instructions that, when executed by one or more processors, cause the one or more processors to:
acquire, from a radar of the subject vehicle, radar data about a passenger cabin of the subject vehicle;
determine a current state of the passenger cabin according to the radar data; and
responsive to identifying that the current state indicates the smoke is present within the passenger cabin, control the subject vehicle to generate a response to the smoke;
wherein the instructions to identify that the current state indicates smoke is present include instructions to compare an intensity of a scatter pattern detected by the radar with a baseline that defines an observation by the radar within the passenger cabin without a presence of smoke.

9. The non-transitory computer-readable medium of claim 8, wherein the instructions to determine the current state include instructions to determine a density of the smoke to estimate a source of a fire by determining an increase in the intensity compared to the baseline.

10. The non-transitory computer-readable medium of claim 8, wherein the instructions to control the subject vehicle to generate the response includes instructions to analyze sensor data from a sensor other than the radar to identify a behavior of an operator, and wherein the behavior is one of smoking, acting frantically, and acting calmly, and wherein the instructions to control the subject vehicle to generate the response include instructions to selecting the response according to the behavior.

11. The non-transitory computer-readable medium of claim 8, wherein the instructions to identify that the current state indicates smoke is present include instructions to identify a location of a fire within the passenger cabin according to at least the radar data, and wherein the instructions to control the subject vehicle to generate the response include instructions to select the response according to the location.

12. A method, comprising:
   acquiring, from a radar of a subject vehicle, radar data about a passenger cabin of the subject vehicle;
   determining a current state of the passenger cabin according to the radar data; and
   responsive to identifying that the current state indicates smoke is present within the passenger cabin, controlling the subject vehicle to generate a response to the smoke;
   wherein identifying that the current state indicates smoke is present includes comparing an intensity of a scatter pattern detected by the radar with a baseline that defines an observation by the radar within the passenger cabin without a presence of smoke.

13. The method of claim 12, wherein determining the current state includes determining a density of the smoke to estimate a source of a fire by determining an increase in the intensity compared to the baseline.

14. The method of claim 12, wherein controlling the subject vehicle to generate the response includes analyzing sensor data from a sensor other than the radar to identify a behavior of an operator, and wherein the behavior is one of smoking, acting frantically, and acting calmly, and wherein controlling the subject vehicle to generate the response includes selecting the response according to the behavior.

15. The method of claim 12, wherein identifying that the current state indicates smoke is present includes identifying a location of a fire within the passenger cabin according to at least the radar data, and wherein controlling the subject vehicle to generate the response includes selecting the response according to the location.

16. The method of claim 12, wherein determining the current state of the passenger cabin includes determining whether a window of the subject vehicle is down and whether a source of the smoke is from outside of the subject vehicle, and wherein controlling the subject vehicle to generate the response includes controlling the window to close.

17. The method of claim 12, wherein controlling the subject vehicle to generate the response includes at least one of: providing a message via a vehicle-to-anything (V2X) communication that indicates to a nearby vehicle a location of the subject vehicle, providing an alert to a pedestrian that is proximate to the subject vehicle, closing a vent of the subject vehicle, and transmitting a communication about the current state to an emergency service, and wherein the communication indicates at least one of: a number of passengers in the subject vehicle, a location of a fire, characteristics about the passengers, and characteristics about the smoke.

* * * * *